UNITED STATES PATENT OFFICE.

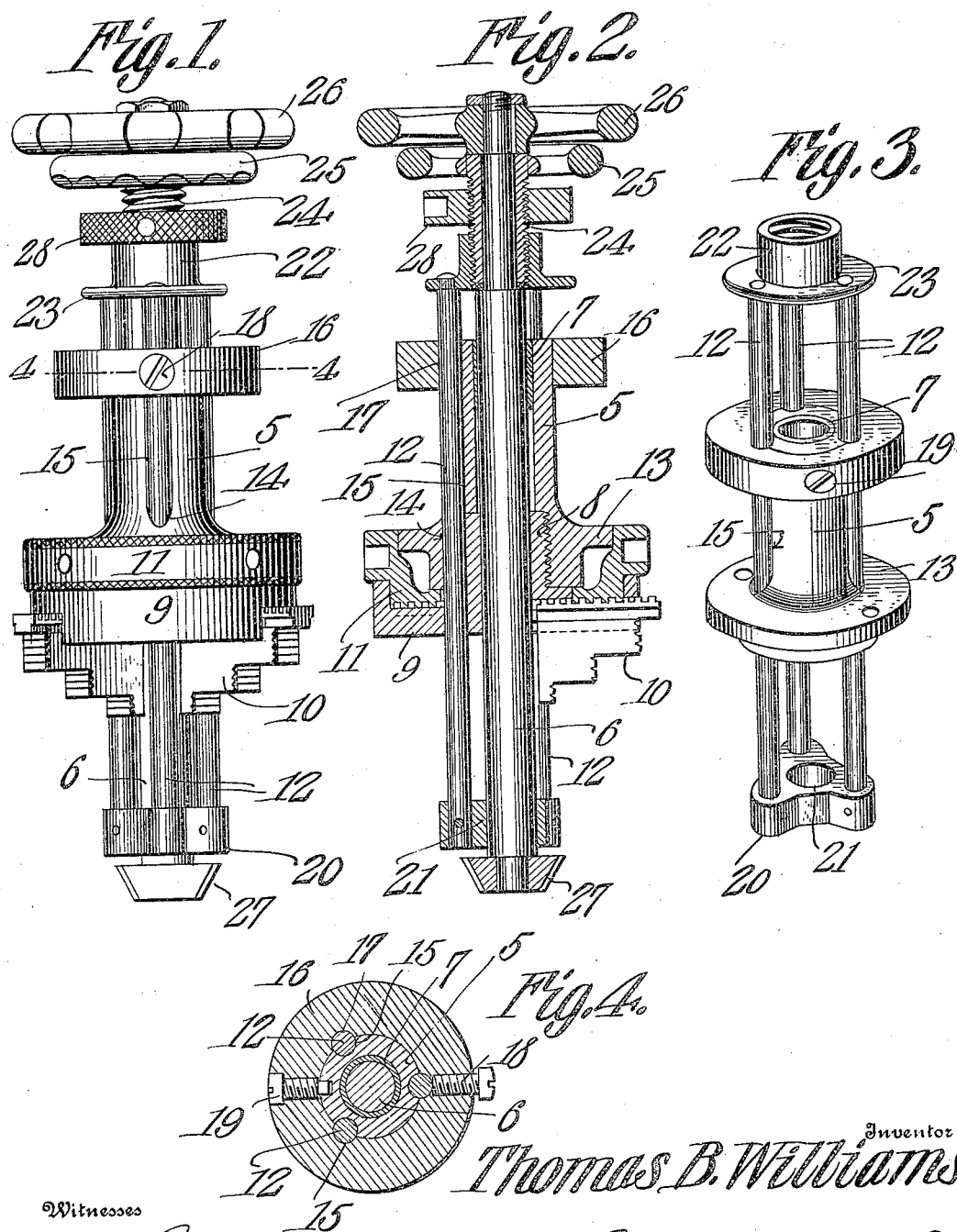

THOMAS B. WILLIAMS, OF ORANGE, MASSACHUSETTS, ASSIGNOR TO THE LEAVITT MACHINE COMPANY, OF ORANGE, MASSACHUSETTS.

VALVE-RESEATING TOOL.

934,642.  Specification of Letters Patent.  Patented Sept. 21, 1909.

Application filed March 12, 1909. Serial No. 482,963.

*To all whom it may concern:*

Be it known that I, THOMAS B. WILLIAMS, a citizen of the United States, residing at Orange, in the county of Franklin and State of Massachusetts, have invented a new and useful Valve-Reseating Tool, of which the following is a specification.

This invention relates to improvements in that type of valve reseating tools illustrated and described in Letters Patent No. 429,939 granted to Charles L. Morse, June 10, 1890, said tool comprising, broadly speaking, a support, a chuck, and a rotary spindle carrying a cutter.

In the use of the tool above referred to, the spindle which carries the cutter is liable to become bent or distorted so as to be practically inoperative. This is due to the inadequacy of the bearing support for the spindle, and the present invention is designed to remedy this structural defect.

Another object of the invention is to provide improved means for adjusting the chuck lengthwise with respect to the spindle so that the tool can be quickly applied to a deep-seated valve.

With the foregoing objects in view, the invention consists in a novel construction and arrangement of parts to be hereinafter described and claimed, reference being had to the drawing hereto annexed in which—

Figure 1 is an elevation of the tool, Fig. 2 is a central vertical section, Fig. 3 is a perspective view of the spindle and chuck supporting frame, Fig. 4 is a transverse section on the line 4—4 of Fig. 1.

The supporting frame of the spindle and chuck comprises a tubular member 5 through the bore of which the spindle 6 passes, said bore being lined at one of its ends with a bearing bushing 7. At the opposite end there is a counterbore which is screw-threaded to receive the tubular portion 8 of a member 9 which carries the chuck jaws 10. The chuck jaws are operated in the ordinary manner by a rotatable ring 11 having on its under side a spiral groove in which work the racks of the chuck jaws. This chuck is an ordinary one, and as nothing is claimed with respect thereto, a further description thereof is thought unnecessary.

The tubular member 5 is slidably mounted on rods 12, three of such rods being provided. That end of the member 5 which carries the chuck is enlarged as indicated at 13, and in said enlargement are openings 14 through which the rods pass. The other portion of the member 5 has grooves 15 in its outer surface to accommodate the rods.

The member 5 is slidable lengthwise on the rods 12 and is locked in adjusted position thereon by means of a collar 16 encircling the same, the inner periphery of the collar having grooves 17 to accommodate the rods. A set screw 18 threaded through the collar is engageable with one of the rods 12, and a set screw 19 also threaded through the collar is engageable with the member 5. It will be seen that upon tightening up the set screws the member 5 will be securely locked on the rods 12, and upon loosening said set screws, it is free to be slid up and down thereon.

The lower ends of the rods are connected by means of a crosshead 20 provided with a central opening 21 to receive the spindle 6. The crosshead also has openings to receive the ends of the stems, and said ends are secured in said openings in any suitable manner. The opposite ends of the stems are connected to a collar 22, said collar having at one of its ends an off-standing annular flange 23 to which the stems are riveted or otherwise rigidly secured. The collar is screw-threaded interiorly to receive the feed screw 24 of the spindle 6. This feed screw is a sleeve mounted on the spindle 6 and operated by a hand wheel 25. To the spindle is fitted a hand wheel 26 for operating the same. Upon turning the hand wheel 25 the spindle is fed forward, and upon turning the hand wheel 26 the spindle is rotated, and when both hand wheels are turned simultaneously, the spindle is fed forwardly and also rotated at the same time. The lower end of the spindle is reduced and screw-threaded to receive the cutter 27. On the feed screw 24 is threaded a collar 28 which, when brought into engagement with the collar 22 acts as a jam nut and prevents rotation of said screw.

By providing the member 5, the spindle 6 is given a bearing support for a greater portion of its length, and is thus held firmly seated, and prevented from being bent or distorted when in use. Upon loosening the set screws 18 and 19, the member 5 can be shifted up or down on the spindle, and the tool is thus adjusted for deep-seated or shallow valves without resorting to the feed screw, and the adjustment can therefore be quickly made.

What is claimed is:

1. In a valve reseating tool, the tubular member, rods passing therethrough on which said member is slidable, means for locking the member on the rods, a feed nut carried by the rods, a chuck carried by the tubular member, a tool spindle passing through the tubular member, and a feed screw on the spindle engageable with the feed nut.

2. In a valve reseating tool, a spindle having a feed screw, a tubular member through which the spindle passes, rods passing through said member and on which rods the member is slidable, means for locking the member on the rods, a connection between the rods at the ends thereof, and having openings to receive the spindle, one of said openings being threaded to receive the feed screw, and a chuck carried by the tubular member.

3. In a valve reseating tool, a tubular member having an enlarged portion provided with openings, rods passing through said openings of the enlarged portion and fitting the outer surface of the other portion of the member, said member being slidable on the rods, a collar encircling the member, and having its inner periphery grooved to accommodate the rods, set screws passing through the collar and engageable respectively with the member and with one of the rods, a chuck carried by said member, a feed nut carried by the rods, a tool spindle passing through the tubular member, and a feed screw on the spindle engageable with the feed nut.

In testimony that I claim the foregoing as my own, I have hereto affixed my signature in the presence of two witnesses.

THOMAS B. WILLIAMS.

Witnesses:
   JAMES D. KIMBALL,
   BURTON C. BANGS.